US008593536B2

(12) United States Patent
Maruyama et al.

(10) Patent No.: US 8,593,536 B2
(45) Date of Patent: Nov. 26, 2013

(54) IMAGE PICKUP APPARATUS WITH CALIBRATION FUNCTION

(75) Inventors: Go Maruyama, Kanagawa (JP); Sadao Takahashi, Kanagawa (JP); Toshimichi Hagiya, Chiba (JP); Jun Watanabe, Kanagawa (JP); Shin Aoki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 254 days.

(21) Appl. No.: 13/042,714

(22) Filed: Mar. 8, 2011

(65) Prior Publication Data

US 2011/0216215 A1 Sep. 8, 2011

(30) Foreign Application Priority Data

Mar. 8, 2010 (JP) ................................. 2010-050713

(51) Int. Cl.
*H04N 5/225* (2006.01)
(52) U.S. Cl.
USPC ................................... 348/218.1; 348/222.1
(58) Field of Classification Search
USPC ............................. 348/49, 135, 218.1, 222.1
See application file for complete search history.

(56) References Cited

U.S. PATENT DOCUMENTS

| 2006/0018509 | A1* | 1/2006 | Miyoshi et al. | 382/104 |
|---|---|---|---|---|
| 2008/0211956 | A1* | 9/2008 | Imada et al. | 348/340 |
| 2010/0002070 | A1* | 1/2010 | Ahiska | 348/36 |
| 2010/0097491 | A1* | 4/2010 | Farina et al. | 348/223.1 |
| 2010/0201809 | A1* | 8/2010 | Oyama et al. | 348/135 |

FOREIGN PATENT DOCUMENTS

| JP | 11-325890 | 11/1999 |
|---|---|---|
| JP | 2004-354257 | 12/2004 |
| JP | 2009-53011 | 3/2009 |
| JP | 2009-250785 | 10/2009 |
| WO | WO 2009/125577 A1 | 10/2009 |

OTHER PUBLICATIONS

Extended Search Report issued Jul. 8, 2011 in Europe Application No. 11157245.9.
Holger Handel, "Compensation of thermal errors in vision based measurement systems using a system identification approach", Signal Processing, 2008, ICSP2008 Proceedings, XP031369298, pp. 1329-1333.
J-P. Kruth, et al., "Thermal Error Analysis and Compensation of an LED-CMOS Camera 3D Measuring System", Measurement Science Review, vol. 3, Section 3, 2003, XP055001009, pp. 5-8.
Zhengyou Zhang, "A Flexible New Technique for Camera Calibration", IEEE Transactions on Pattern Analysis and Machine Intelligence, vol. 22, No. 11, Nov. 2000, pp. 1330-1334.

* cited by examiner

*Primary Examiner* — Gevell Selby
(74) *Attorney, Agent, or Firm* — Oblon, Spivak, McClelland, Maier & Neustadt, L.L.P.

(57) ABSTRACT

An image pickup apparatus comprises a lens array with a plurality of lenses, a part of which lenses makes one or more stereo lens pairs; an image pickup device for taking a multi-faceted compound-eye image consisting of a set of monocular images formed by the plural lenses; and a computing unit for computing range imagery from one or more pairs of the monocular images formed by said one or more stereo lens pairs. The computing unit includes imaging position determination means for determining from the monocular images an image pickup position of each of one or more subjects whose relative positional relationships with respect to the image pickup apparatus are known by dividing the multifaceted compound-eye image into the monocular images, and image distortion parameter determination means for determining an image distortion parameter based upon a determination result of the imaging position determination means.

5 Claims, 8 Drawing Sheets

FIG.7

| Temperature | Image Center | Focal Length | Distortion Parameter |
|---|---|---|---|
| −40°C | (U1,V1) | F1 | K1_1,k1_2 |
| −20°C | (U2,V2) | F2 | K2_1,k2_2 |
| 0°C | (U3,V3) | F3 | K3_1,k3_2 |
| 20°C | (U4,V4) | F4 | K4_1,k4_2 |
| 40°C | (U5,V5) | F5 | K5_1,k5_2 |
| 60°C | (U6,V6) | F6 | K6_1,k6_2 |
| 80°C | (U7,V7) | F7 | K7_1,k7_2 |
| 100°C | (U8,V8) | F8 | K8_1,k8_2 |

FIG.8

| Temperature | Marker Position (X-coordinate) at I1 | Marker Position (Y-coordinate) at I1 | Marker Position (X-coordinate) at I2 | Marker Position (Y-coordinate) at I2 |
|---|---|---|---|---|
| −40°C | X1_1 | Y1_1 | X2_1 | Y2_1 |
| −20°C | X1_2 | Y1_2 | X2_2 | Y2_2 |
| 0°C | X1_3 | Y1_3 | X2_3 | Y2_3 |
| 20°C | X1_4 | Y1_4 | X2_4 | Y2_4 |
| 40°C | X1_5 | Y1_5 | X2_5 | Y2_5 |
| 60°C | X1_6 | Y1_6 | X2_6 | Y2_6 |
| 80°C | X1_7 | Y1_7 | X2_7 | Y2_7 |
| 100°C | X1_8 | Y1_8 | X2_8 | Y2_8 |
|  |  |  |  |  | ns
IMAGE PICKUP APPARATUS WITH CALIBRATION FUNCTION

TECHNICAL FIELD

The present invention generally relates to an image pickup apparatus, and more particularly, to a technique for correcting optical conditions that vary according to an environmental temperature change to improve accuracy of range determination.

BACKGROUND ART

Image pickup apparatuses are useful instruments for acquiring image information and applied to various fields such as portable appliances, in-vehicle equipment, medical instruments and equipment, and industrial instruments and equipment. A demand for more intelligent range imagery input apparatuses capable of acquiring not only two-dimensional image data, but also range information including a distance from a subject and a three-dimensional shape of the subject is also increasing. Such range imagery input apparatuses are actually used in various places. However, it is known that the lens shape of an image pickup apparatus varies and accordingly, the optical conditions of the apparatus change due to changes in the environmental conditions (especially, due to a temperature change) in which the image pickup apparatus is placed.

A known technique for correcting optical conditions fluctuating due to temperature changes is disclosed in Patent Document 1 listed below. An image pickup apparatus disclosed in this document comprises a lens unit consisting of multiple optical lens elements arranged in the same plane; an image pick-up device having multiple image pick-up regions, each region corresponding to one of the optical lens elements; and a temperature sensor positioned in contact with the lens unit to sense the temperature of the lens unit. Distances between the optical axes of the optical lens elements are corrected based upon the sensed temperature, and the range from the subject is calculated after the correction.

Patent Document 2 discloses an image pickup apparatus that includes a lens array with plural lenses arranged into a single unit; plural image-pickup regions, each region corresponding to one of the lenses of the lens array; and a housing that holds the lens array. The lens array is fixed to the housing at a predetermined point. The lens array is held at the housing so as to be deformable according to thermal expansion with respect to the predetermined point.

Patent Document 3 discloses an image correcting apparatus for correcting optically caused positional displacement of the captured image taken by a stereo camera. In this document, the positional displacement due to variation with time is corrected according to the detected position of a marker.

Patent Document 4 discloses a stereo camera system that extracts a feature quantity from an image and selects calibration data based upon the feature quantity.

However, it is generally known that variations in the environmental temperatures cause the lens shape of an image pickup apparatus to change, and that the optical conditions inevitably change. Especially when using a range determination device with a short baseline length, such as a system disclosed in the above-described Patent Document 2 employing a combination of an image pickup sensor and a lens array to carry out range measurement, the ratio of change in the baseline length due to a temperature change is great, and therefore the range determination result is significantly affected. To overcome this problem, Patent Document 2 proposes the structure for holding the lens array at a single point to preclude adverse influence of stresses in the adhesives or the shielding blocks varying among devices. However, this method requires a temperature to be sensed although not explicitly described. In addition, influence of the device variability cannot be completely removed.

Patent Documents 3 and 4 are directed to a method for correcting aging variation in a stereo camera system, focusing on a device for correcting an external parameter, that is, a distance between cameras, and these methods require multiple markers.

Patent Document 1: JP 2009-250785 A
Patent Document 2: JP 2009-53011 A
Patent Document 3: JP H11-325890 A
Patent Document 4: JP 2004-354257 A

DISCLOSURE OF INVENTION

The present invention was conceived in view of the above-described technical problems in the prior art, and it is an objective to provide an image pickup apparatus with improved accuracy in range determination. This objective can be achieved by dividing a multifaceted compound-eye image taken by image pickup elements into monocular images, detecting a subject with a known positional relationship relative to the image pickup apparatus from each of the monocular images, determining a distortion parameter based upon a position of the detected subject, and correcting the distortion of each of the monocular images using the distortion parameter.

In one aspect of the invention, an image pickup apparatus comprises:

a lens array placed at a position facing a subject to be taken and having a plurality of lenses arranged in an array, a part of the lenses making one or more stereo lens pairs;

an image pickup device placed on an image-plane side of the lens array and configured to take a multifaceted compound-eye image consisting of a set of monocular images formed by the plural lenses; and a computing unit for computing range imagery from a pair of monocular images formed by said one or more stereo lens pairs, wherein the computing unit includes imaging position determination means for determining from the monocular images an image pickup position of each of one or more subjects whose positional relationships relative to the image pickup apparatus are known; and image distortion parameter determination means for determining an image distortion parameter based upon a determination result of the imaging position determination means;

wherein the imaging position determination means divide the multifaceted compound-eye image taken by the image pickup device into the monocular images and detect from the monocular images said one or more subjects with known positional relationships relative to the image pickup apparatus, and wherein the image distortion parameter determination means determine the distortion parameter based upon a detected position of each of the subjects to correct the distortion of each of the monocular images using the distortion parameter.

As an unlimited example, the subject with the known relative positional relationship may be a marker.

As an unlimited example, the marker is placed at such a position that allows the monocular image of the marker to be taken.

In another aspect of the invention, a range determination system is provided. The range determination system includes a lens array placed at a position facing a subject to be taken and having a plurality of lenses arranged in the array, a part of the lenses making one or more stereo lens pairs; an image pickup device placed on an image-plane side of the lens array and configured to take a multifaceted compound-eye image consisting of a set of monocular images formed by the plural lenses; a computing unit for computing range imagery from a pair of monocular images formed by said one or more stereo lens pairs; one or more markers whose positional relationships relative to the image pickup device are known; imaging position determination means for determining the positions of said one or more markers from the monocular images; and image distortion parameter determination means for determining an image distortion parameter based upon a determination result of the imaging position determination means.

By recognizing the image pickup position of a reference subject externally existing, range determination errors due to a temperature change can be reduced. By using a marker as the reference subject, the positional displacement of the reference subject can be detected precisely. When providing a marker in the system, it is unnecessary to prepare an external reference subject outside the image pickup apparatus, and a possible problem that may arise when using an external marker can be prevented. An example of such a problem is that the external reference subject may not be detected if another object exists between the external reference subject and the image pickup apparatus. By structuring a system using a combination of an image pickup apparatus and a marker, freedom of design will increase, and distortion or positional displacement of the reference markers (subject) can be determined more precisely.

BRIEF DESCRIPTION OF THE DRAWINGS

FIG. 7 shows the relationship between temperature change and change in interior parameters;

FIG. 8 shows the relationship between temperature and marker position;

DETAILED DESCRIPTION OF THE EMBODIMENTS

The preferred embodiments of the present invention will now be described below in conjunction with the attached drawings. It should be noted that the invention is not limited to the structural components, forms, combinations, shapes, relative layout, or the like described below, and that these structures are exhibited for the exemplifying purpose only.

Figure 1:
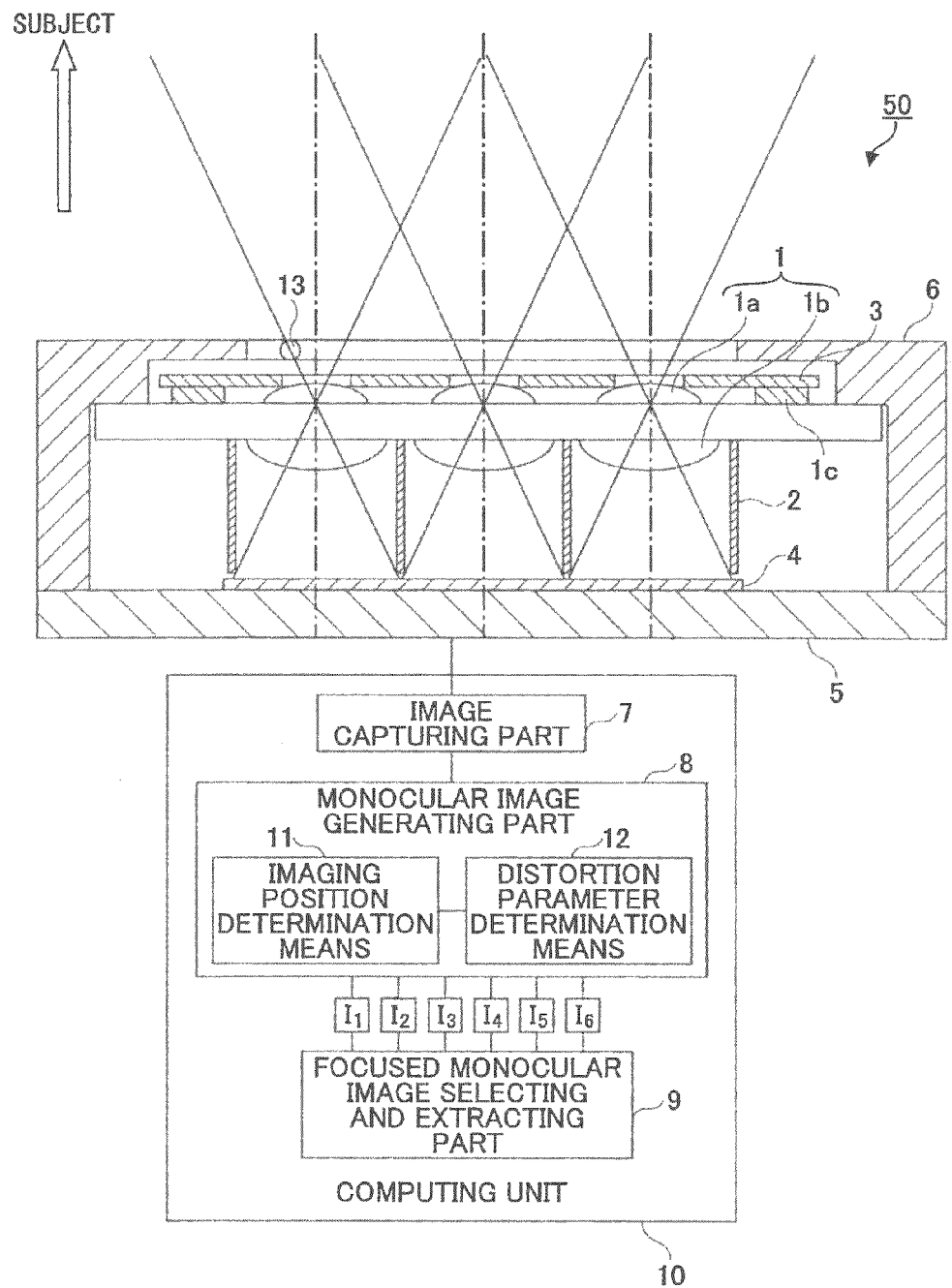
FIG. 1 is a schematic diagram illustrating a structure of an image pickup apparatus according to the first embodiment of the invention.

FIG. 1 is a schematic diagram showing an example of the image pickup apparatus according to an embodiment of the invention. The image pickup apparatus 50 is placed so as to face a subject (not shown) to be taken, and includes a lens array 1 and a CMOS sensor (i.e., an image pickup device) 4 positioned on the image-plane side of the lens array 1. The lens array 1 has multiple lenses 1a and multiple lenses 1b arranged in an array. The CMOS sensor 4 takes a multifaceted compound-eye image consisting of a set of demagnified images (which images are referred to as "monocular images") formed by the multiple lenses 1a and 1b. The image pickup apparatus 50 also includes a computing unit 10 for processing the multifaceted compound-eye image taken by the CMOS sensor 4, and a light shield 2 for blocking crosstalk of light beams between adjacent lenses of the lens array 1.

The computing unit 10 includes an image capturing part 7 for receiving the image from the CMOS sensor 4, a monocular image generating part 8 for generating monocular images from the captured image data, and a focused monocular image selecting/extracting part 9 for extracting one or more focused monocular images from the monocular images generated by the monocular image generating part 8. The monocular image generating part 8 includes imaging position determination means 11 and image distortion parameter determination means 12. The imaging position determination means 11 determines from among the monocular images the imaging position of one or more subjects whose positional relationships relative to the image pickup apparatus 50 are known in advance. The image distortion parameter determination means 12 determines an image distortion parameter based upon the determination result of the imaging position determination means 11. The computing unit 10 divides the multifaceted compound-eye image taken by the CMOS sensor 4 into multiple monocular images, and detects from the monocular images one or more subjects having known relative positional relationship with respect to the image pickup apparatus. The computing unit 10 then determines at the image distortion parameter determination means 12 a distortion parameter based upon the positions of the detected subjects to correct a distortion of each of the monocular images using the distortion parameter.

The top half of FIG. 1 is a schematic cross-sectional view of the image pickup part of the image pickup apparatus 50, and a subject is located in the direction of the white arrow.

Figure 2:
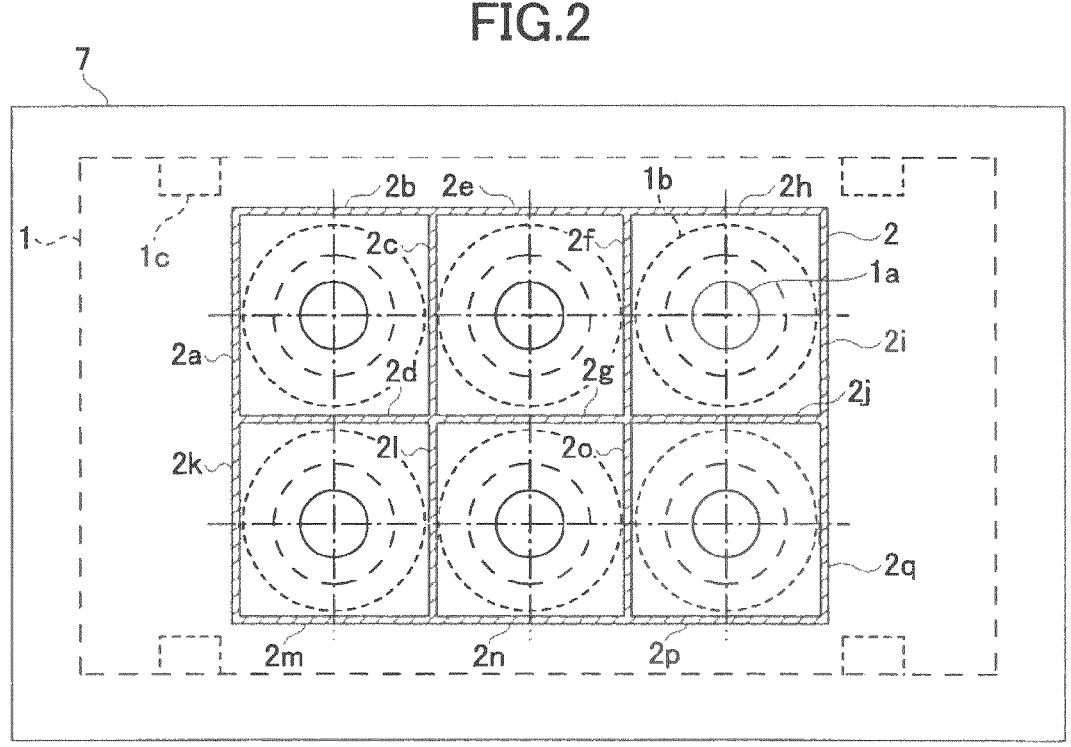
FIG. 2 is a schematic plan view of the image pickup apparatus shown in FIG. 1, which is observed from the subject to be taken.

FIG. 2 is a plane view of the image pickup apparatus 50 observed from the subject. The same elements shown in FIG. 1 are denoted by the same numerical symbols. The lens array 1 has a first surface facing the subject (located on the subject-side) and a second surface (located on the imaging-side) having an image plane facing the CMOS sensor 4. The lens array 1 includes multiple lenses arranged in a matrix.

Returning to FIG. 1, the lens array 1 shown in this example is a double-face lens array, one lens array provided to the subject-side surface and the other provided to the imaging-side surface. The lens array 1 includes lenses 1a arranged on the subject-side surface and lenses 1b arranged on the imaging-side surface. Each pair of the lens 1a and lens 1b focuses the image of the subject on the image plane.

The light shield 2 is made of a material opaque with respect to the light beams, such as a metal or a resin, and used to block crosstalk between adjacent lens pairs. The light shield 2 has square openings, each opening corresponding to one of the lens pairs of the lens array. The walls defining the square openings serve as the crosstalk blocking partitions. The light shield 2 is fixed to the imaging-side surface of the lens array 1. An aperture array 3 is positioned over the lens array 1. The aperture array 3 has round apertures formed in a plate such that each aperture corresponds to one of the lens pairs and serves as a stop of the lens pair. The aperture array 3 is fixed to the lens array 1 via a spacer or a projection 1c. The CMOS sensor 4 is placed on the substrate 5 to sense the images of the subjects taken by the respective lens pairs of the lens array 1. Although not shown in FIG. 1, an anti-aliasing optical low-pass filter or a sensor-protection cover glass may be provided to the image pickup apparatus 50 as necessary. A housing 6 is fixed to the substrate 5 so as to hold the lens array 1 at the subject-side surface and accommodate the assembly of the lens array 1, the light shield 2 and the aperture array 3.

Next, explanation is made of the images acquired by the image pickup apparatus 50 and the processing operations performed on the images. The images taken by the CMOS sensor 4 are received at the image capturing part 7 of the computing unit 10, and then divided into six monocular images by the monocular image generating part 8. A disparity is computed using the six monocular images to estimate the range to the subject. The disparity may be computed by detecting a disparity between monocular images by means of cross-correlating operations performed on each of the micro regions in the monocular images. The position of a corresponding point is detected at each of the monocular images, and the extreme value is determined while correcting the positions of the corresponding points. For example, the corresponding points of micro regions of two monocular images (e.g., image I5 and image I6) are detected, and the positions of the corresponding points of the two images and the disparity at those positions are calculated. In general, the lens pitch is designed constant. Accordingly, once the disparity between a pair of monocular images (e.g., I5 and I6) is calculated, the corresponding positions of the other monocular images (e.g., I1 through I4) and the disparities at these positions can be calculated. Then, the positions of the corresponding points can be calculated from the disparities. The pixel at the corresponding point at each of the monocular images is determined and then the extreme value of the brightness is calculated to acquire a focused image more accurately.

Figure 3:
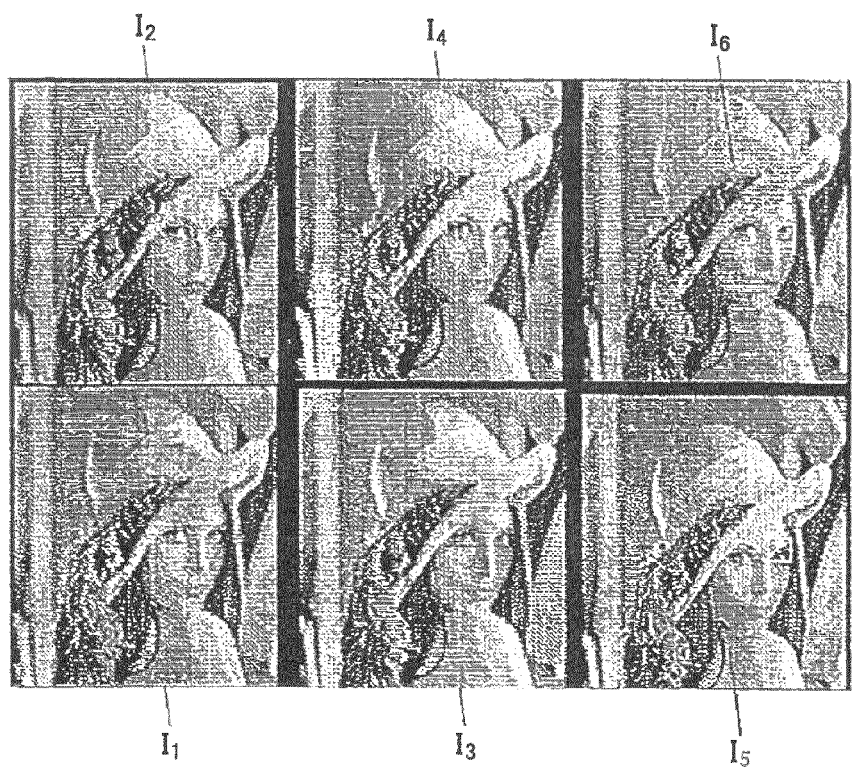
FIG. 3 is an example of a multifaceted compound-eye image acquired through the lens array of the image pickup apparatus shown in FIG. 1.
Figure 4:
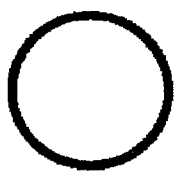
FIG. 4 illustrates an example of a marker used in the invention.
Figure 5:
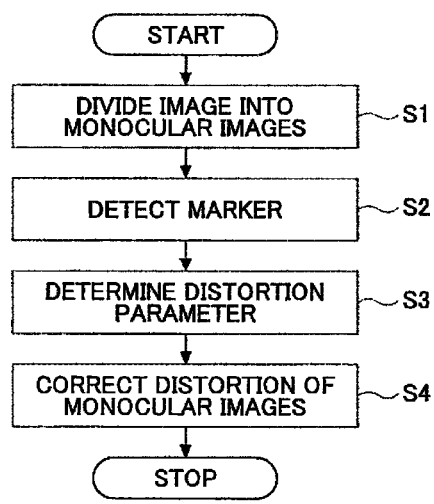
FIG. 5 is a flowchart showing the operations of the monocular image generating part of the image pickup apparatus.

FIG. 5 is a flowchart showing the operation of the monocular image generating part 8. First, an image is received from the image capturing part 7 and the image is divided into multiple monocular images (for example, six images I1-I6, as illustrated in FIG. 3 (S1). Then a marker (which has a known positional relationship relative to the image pickup apparatus 50) is detected at each of the monocular images. It is desirable to use such a marker that is easily detected. For example, a white disk rimed by black may be used as the marker, as shown in FIG. 4. When applying the image pickup apparatus 50 to an in-vehicle camera, a room light or a pillar edge may be used as the marker. The size of the marker is appropriately selected based upon the image pickup device used in the apparatus and the distance between the marker and the image pickup apparatus.

Then, the markers are detected (S2) in two monocular images, for example in I1 and I2, by the marker detection means (i.e., the imaging position determination means 11). The markers may be detected by template matching. Although in this example explanation is made using a single marker, the more the makers, the more accurate can range measurement be achieved. However, providing too many markers in the application of the invention to the in-vehicle camera may diminish the freedom of design of the interior of the vehicle, and therefore, it is preferable to choose an appropriate number of markers depending on the application.

Then, a distortion parameter is determined (S3) by the distortion parameter determination means 12 based upon the detected positions of the markers of the two monocular images. The distortion parameter may be determined using a lookup table, the details of which will be described below. Then, the distortion correction is performed on each of the monocular images (S4) using the acquired distortion parameter. The range from the subject is calculated based upon the distortion-corrected monocular images. In the above-described example, markers are detected from two monocular images; however, the invention is not limited to this example. The marker(s) may be detected from a single monocular image or all of the six monocular images. The positional relationship between the image pickup apparatus 20 and the marker 21 may be one shown in FIG. 6.

[Creation of Lookup Table]

Explanation is made of correction of image distortion. Image distortion is corrected using, for example, the Zhang's calibration method (see, "A flexible new technique for camera calibration", IEEE Transactions on Pattern Analysis and Machine Intelligence, 22(11): 1330-1334, 2000) in this embodiment. Of course, the invention is not limited to this example. It is assumed that the invention is applied to an in-vehicle security camera in the embodiment described below. The image pickup apparatus of the invention is set in the environment with temperatures varying in a wide range (−40° C., −20° C., 0° C., 20° C., 40° C., 60° C., 80° C., and 100° C.), and interior parameters of the camera, such as an image center, a focal length, or a distortion parameter are calculated at each of the temperatures using the Zhang's method. As a result, data shown in FIG. 7 are acquired, which data show the relationship between temperature and interior parameters of the camera.

Figure 6:
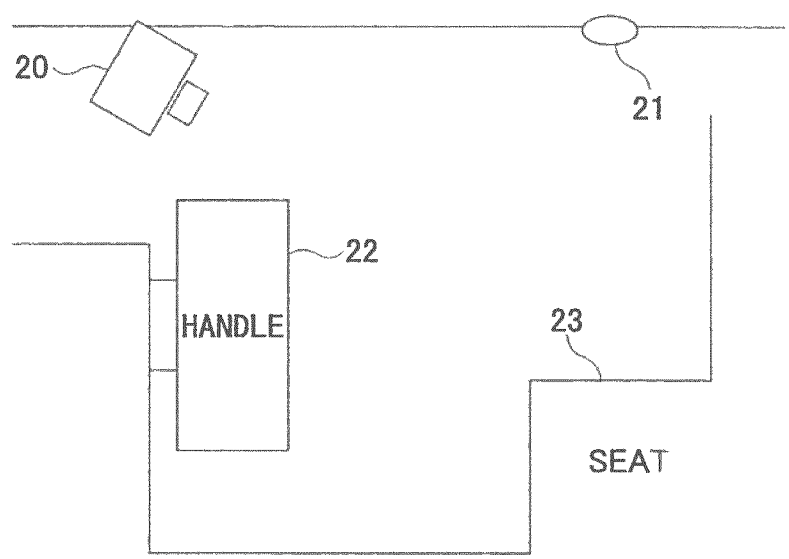
FIG. 6 is a schematic diagram illustrating an example of the in-vehicle environment.

Then, an in-vehicle environment mofrl, such as one shown in FIG. 6, is prepared. The image pickup apparatus 20 is placed diagonally in front of the driver's seat in FIG. 6; however, it may be fixed at an arbitrary position. The marker 21 is positioned at the ceiling of the vehicle above the seat 23. In place of the marker 21, any object whose positional relationship with respect to the image pickup apparatus 20 is known in advance may be used. For example, the corner of the driver's seat or the edge of the room light may be used. The marker (e.g., one used in S2 of FIG. 5) is detected from the monocular images I1 and I2 at each of the temperatures (−40° C., −20° C., 0° C., 20° C., 40° C., 60° C., 80° C., and 100° C.). Then, the relationship between temperature and marker position is obtained as shown in FIG. 8.

A function defining a relationship between temperature and position of the marker is estimated from the table shown in FIG. 8 using an approximate function or any suitable algorithm, to output a temperature in response to an input of the positions of marker I1 (X1,Y1) and marker I2 (X2,Y2). From the tables of FIG. 7 and FIG. 8, the relationship between position of a detected marker and interior parameters of the camera is determined without using a temperature sensor. To be more precise, using the marker detection result (i.e., the detected position of the marker) obtained in S2 of FIG. 5 and referring to the lookup table, the distortion parameter can be determined in S3 of FIG. 5.

A marker 13 may be provided in the vicinity of the image pickup apparatus 50 as illustrated in FIG. 1 and FIG. 2. When the marker 13 is provided in the vicinity of the image pickup apparatus 50, the image of the marker 13 is captured in the monocular images without fail. The process carried out by the monocular image generating part 8 is the same as that explained above.

In the present invention, adverse influence of a temperature change on range determination can be removed by using the position of a known object taken by the CMOS sensor 4. The object with a known positional relationship may be located outside the camera, or alternatively, a marker may be attached to the image pickup apparatus.

Figure 9:
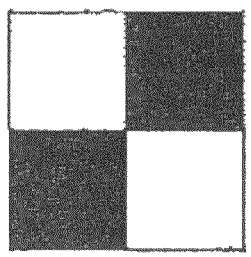
FIG. 9 illustrates another example of a marker.
Figure 10:
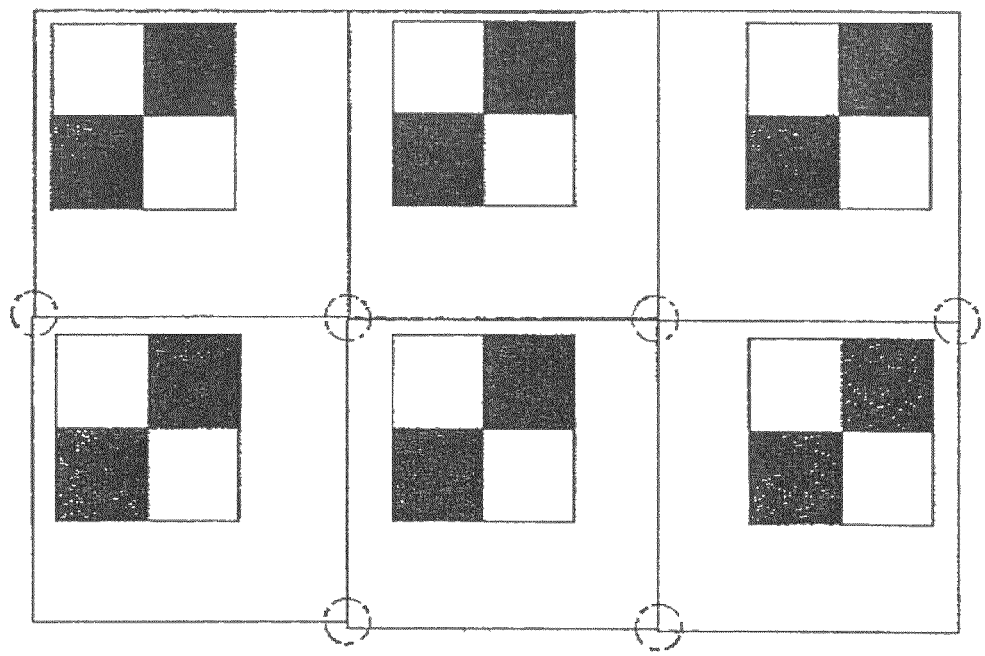
FIG. 10 is an image of the marker of FIG. 9 taken at temperature A.
Figure 11:
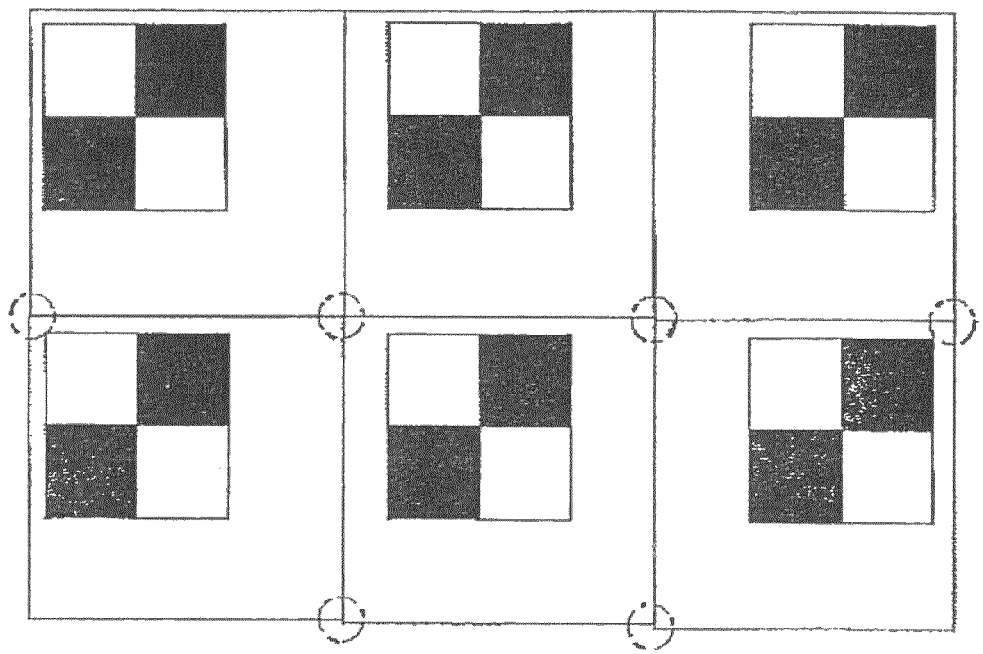
FIG. 11 is an image of the marker of FIG. 9 taken at temperature B.

FIG. 9 illustrates another example of the marker, which is a checkered pattern or chart. FIG. 10 shows an image of the checkered pattern (chart) of FIG. 9 taken by the image pickup apparatus 50 of FIG. 1 at temperature A. FIG. 11 shows an image of the same checkered pattern taken by the image pickup apparatus 50 at temperature B. The positions of the checkered patterns in the monocular images differ between FIG. 10 and FIG. 11 due to the temperature change. Variation in the image pickup position of the subject due to temperature change degrades the accuracy of range determination. To overcome this problem, a subject with known positional relationship relative to the image pickup apparatus 50 is prepared in advance, and the variation in the image quality due to a temperature change is estimated from the positional displacement of the captured image of the subject, without using a temperature sensor, to correct distortion of the image.

In the embodiment, a temperature change can be determined from the positional displacement of the image of a reference object existing outside the camera. This arrangement is different from the conventional technique that determines temperature change using a reference object provided in the camera. With the conventional technique, the measurement accuracy is lost if the position of the reference object itself changes due to a temperature change. In contrast, using an object located far from the image pickup apparatus as a reference can greatly reduce adverse influence of fluctuation of the position of the reference object itself. It should be noted that if another object exists between the reference object and the image pickup apparatus, image distortion due to a temperature change cannot be measured, and therefore, the position of the reference object has to be carefully chosen.

The above-described Zhang's method disclosed in "A flexible new technique for camera calibration" has a problem that the reference pattern (or chart) has to be taken in the entire area of the image, and therefore, distortion parameters cannot be determined if an object exists between the image pickup apparatus and the reference pattern. In addition, the Zhang's method requires multiple charts arranged at various positions and images of these charts have to be taken. Accordingly, it is difficult for the Zhang's method to quickly follow the temperature change. In contrast, with the present invention, a temperature change can be detected from a positional displacement of the image of the marker, and an appropriate distortion parameter can be selected based upon the determined temperature change to correct the measurement error due to the temperature change.

A specific marker 13 whose positional relationship relative to the image pickup apparatus 50 is known may be incorporated in a range determination system. In this case, the system is structured by such a marker 13, imaging position determination means 11 for detecting the imaging position of the marker from the monocular images, and distortion parameter determination means 12 for determining an image distortion parameter based upon the imaging position determination result.

This international patent application claims the benefit of the earlier filing date of Japanese Priority Application No. 2010-050713 filed on Mar. 8, 2010, the entire contents of which are incorporated herein by reference.

The invention claimed is:

1. An image pickup apparatus comprising:
a lens array placed at a position facing a subject to be taken and having a plurality of lenses arranged in an array, a part of the lenses making one or more stereo lens pairs;
an image pickup device placed on a side of an image plane of the lens array and configured to take a multifaceted compound-eye image consisting of a set of monocular images formed by the plural lenses; and
a computing unit for computing range imagery from one or more pairs of the monocular images formed by said one or more stereo lens pairs,
wherein the computing unit includes
imaging position determination means for determining from the monocular images an image pickup position of each of one or more of the subjects whose relative positional relationships with respect to the image pickup apparatus are known; and
image distortion parameter determination means for determining an image distortion parameter based upon a determination result of the imaging position determination means;
wherein the imaging position determination means divide the multifaceted compound-eye image taken by the image pickup device into the monocular images and detect from the monocular images said one or more subjects with known relative positional relationships, and the image distortion parameter determination means determine the distortion parameter based upon a detected position of each of the determined subjects to correct the distortion of each of the monocular images using the distortion parameter,
wherein the image distortion parameter determination means includes a table in which a distortion parameter is associated with a position of an object in the monocular images, and
wherein the distortion parameter of the table describes a relationship between temperature change and positional displacement of the monocular image of the subject with the known positional relationship relative to the image pickup apparatus.

2. The image pickup apparatus according to claim 1, wherein the subject with known relative positional relationship is a marker.

3. The image pickup apparatus according to claim 2, wherein the marker is placed at a position that allows the monocular images to be taken.

4. The image pickup apparatus according to claim 1, wherein the table of the image distortion parameter determination means further describes the relationship between temperature change and distortion parameter.

5. A range determination system comprising:
a lens array placed at a position facing a subject to be taken and having a plurality of lenses arranged in an array, a part of the lenses making one or more stereo lens pairs;
an image pickup device placed on a side of an image plane of the lens array and configured to take a multifaceted compound-eye image consisting of a set of monocular images formed by the plural of lenses;
a computing unit for computing range imagery from one or more pairs of the monocular images formed by said one or more stereo lens pairs;
one or more markers whose relative positional relationships with respect to the image pickup device are known;
imaging position determination means for determining the positions of said one or more markers from the monocular images; and image distortion parameter determination means for determining an image distortion parameter based upon a determination result of the imaging position determination means, wherein the image distortion parameter determination means includes a table in which the distortion parameter is associated with a position of an object in the monocular images, and wherein the distortion parameter of the table describes a relationship between temperature change and positional displacement of the monocular image of the subject with the known positional relationship relative to the image pickup apparatus.

* * * * *